April 25, 1944.   L. O. GRIFFITH   2,347,556
BUILDING BLOCK AND METHOD OF MAKING IT
Filed June 29, 1939   2 Sheets-Sheet 1
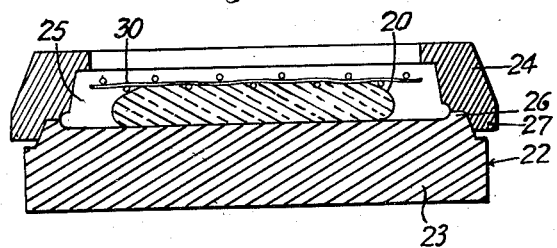
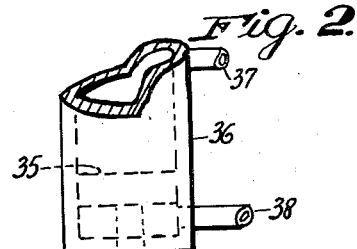
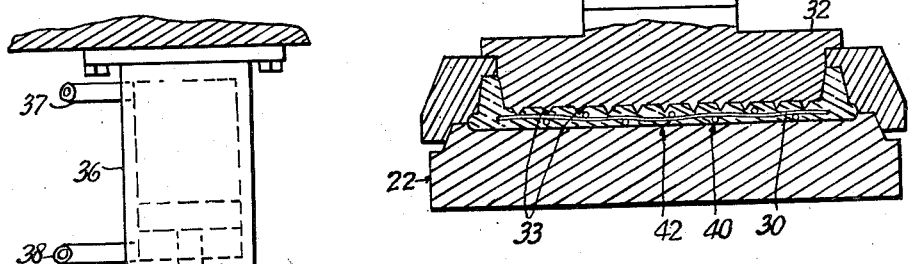
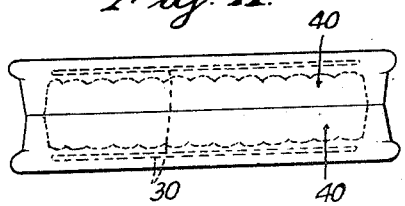
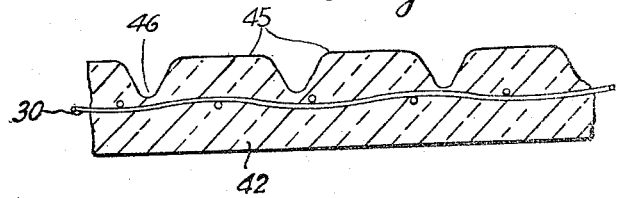
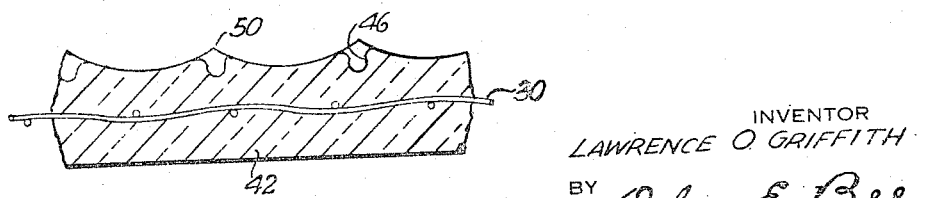
INVENTOR
LAWRENCE O. GRIFFITH
BY Olen E. Bee
ATTORNEY April 25, 1944.  L. O. GRIFFITH  2,347,556
BUILDING BLOCK AND METHOD OF MAKING IT
Filed June 29, 1939   2 Sheets-Sheet 2
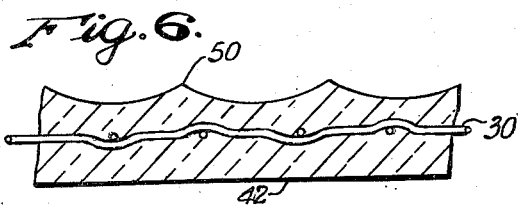
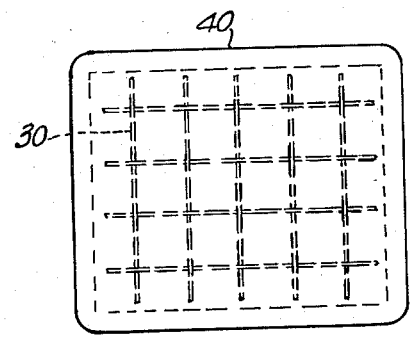
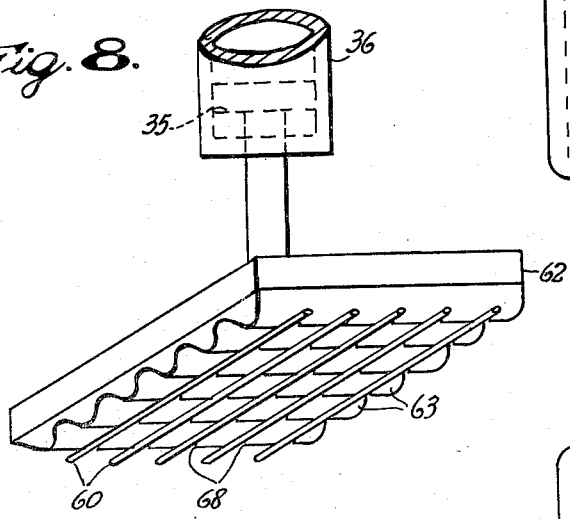
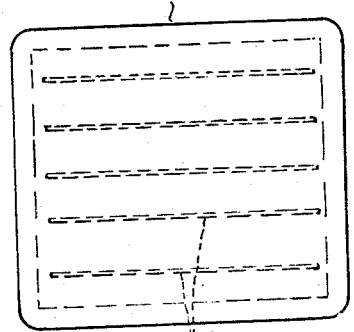
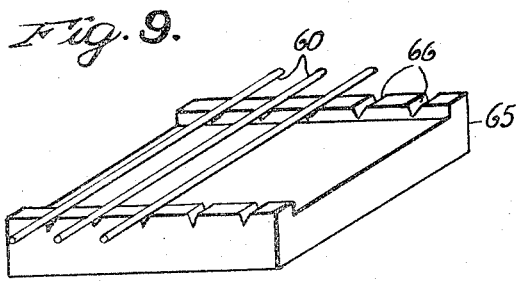
INVENTOR
LAWRENCE O. GRIFFITH
BY Olen E. Bee
ATTORNEY Patented Apr. 25, 1944

2,347,556

UNITED STATES PATENT OFFICE 2,347,556

BUILDING BLOCK AND METHOD OF MAKING IT

Lawrence O. Griffith, Port Allegany, Pa., assignor to Pittsburgh-Corning Corporation, Allegheny County, Pa., a corporation of Pennsylvania Application June 29, 1939, Serial No. 281,845

3 Claims. (Cl. 49—81)

This invention relates to building blocks and it has particular relation to methods of making reinforced building blocks.

One object of the invention is to provide an improved method of making reinforced building blocks.

Another object of the invention is to provide an improved method of making light-diffusing and reinforcing elements combined with a building block composed of fusible material.

Another object of the invention is to provide an improved method of making the structure of facing walls of a building block.

One of the principal features of the invention involves the manufacture of building blocks of the type in which companion sections of substantially cup-shape are formed of fusible material, such as vitreous substances, or the like, which can be reduced to plastic form and then hardened. The completed block is hollow and includes facing walls which are provided with reinforcing elements, such as metal wire mesh or strands embedded therein.

In the drawings:

Figure 1 is a vertical section of a portion of a mold having a body of fusible material therein preparatory to performing a molding operation; Fig. 2 is a vertical section of a mold and plunger in their operative position for molding a body of fusible material; Fig. 3 is a vertical section of a mold and another form of plunger employed in a secondary operation of molding fusible material; Fig. 4 is a fragmentary cross section, on a larger scale, of a reinforced wall portion of a building block in a primary stage of its formation; Fig. 5 is a fragmentary cross section of a wall portion of a building block illustrating a succeeding stage of its formation; Fig. 6 is a fragmentary cross section of a wall of a building block in its finished state; Fig. 7 is a facing elevation of a reinforced building block; Fig. 8 is a perspective of a magnetic plunger employed in practicing the invention; Fig. 9 is a perspective of a rack for gauging reinforcing members to be embedded in the block walls; Fig. 10 is a facing elevation of a building block in which the form of reinforcing elements shown in Figs. 8 and 9 have been incorporated; and Fig. 11 is an edge elevation of a completed building block.

In practicing the invention, a body 20 of fusible or plastic material, such as glass, is reduced to plastic state by heating and is placed in a mold 22 which includes a lower base section 23 and a removable upper section 24 combined therewith to form a molding chamber 25. Suitable interfitting flanges 26 and 27 formed on the mold sections provide for proper centering thereof relative to each other. A section of metal reinforcing structure 30, in the form of a grid, wire mesh, or strands, is placed upon the upper surface of the body 20 which is then molded to the shape of the chamber 25 by means of a plunger 32 having its lower face formed with projections 33 for pressing the metal reinforcing structure 30 into embedded relation in the body during the molding operation.

A fluid-operated piston 35 rigidly connected to the plunger is slidably operable in a cylinder 36 by means of fluid supplied to and exhausted from conduits 37 and 38 connected to the cylinder above and below the piston in a conventional manner. The plunger can thus be forced into the mold, and then removed therefrom after the body of material 20 has been formed.

After the plastic material has been molded into the form of a cup-shaped block section 40, it will be noted that a horizontal wall 42 (Figs. 2 and 4) will have been formed in which inner projections 45 extend above the plane of the embedded reinforcing structure 30 which is exposed at the bottom of indentations 46 formed by the plunger projections.

While the body of material is still plastic, the plunger 32 is withdrawn and the mold is moved to a position beneath a second plunger 48 which is operated in the same manner as the plunger 32 and hence the same reference characters are employed to denote corresponding operating parts. Shorter projections or corrugations 49, which may be rounded, are formed on the face of the plunger 32 and engage the plastic projections 45. Pressure applied by the plunger 48 closes and seals the indentations 46 (Figs. 5 and 6) and form lighter projections or ribs 50. In Fig. 5, the indentations 46 are shown as being partially closed, and in Fig. 6 ribs 50 are shown as they appear in the finished wall with the reinforcing structure completely embedded therein. Thus the corrugations 49 form the rib design 50 upon the inner face of the block wall.

Upon withdrawing the second plunger 48 and removing the upper section 24 of the mold, the block section 40 can be removed and assembled in closed relation with a companion block of the same construction, as shown in Fig. 11. In making glass blocks by this procedure, the finished article is translucent and the decorating ribs 50 which also serve to diffuse light are visible through the block wall. Likewise the reinforcing metal structure is visible and can be of such arrangement as to provide a decorative display.

In Fig. 8, strands of metal or wire can be applied in parallel relation to the bottom or face of a plunger 62 having projections or ribs 63 and which is magnetized to hold the separate wires in proper relation until the plunger is forced into the mold 20 as described above. The remaining portions of the plunger and its operating elements correspond to those previously described and are designated by corresponding reference characters. In connection with the plunger 62, a rack 65 having parallel recesses 66 formed therein serves as a preliminary support for arranging wires in parallel relation until they are adhered to the face of the plunger. After these parallel wires are embedded in the block sections substantially according to the procedure described above with reference to Figs. 1 and 2, the secondary plunger 48 is applied to provide the completed block section. If desired the face of the plunger 62 can be formed with notches 68 of such size as to receive the wire strands therein in wedged relation and hold them until they are embedded in the plastic body. The tendency of the wires to remain adhered in the plastic material after the preliminary molding operation has been achieved will insure their release from the notches 68 and they will remain embedded in the form of a grid.

From this description it will be apparent that various forms of reinforcing material can be embedded in the facing walls of the building block in connection with the molding operation which shapes the block sections as desired.

The block sections 40 are assembled in the form shown in Fig. 11 in such manner that their edges are fused, or otherwise rigidly secured by conventional operations to form the unitary block 40 in which all of its walls are continuous and provide a hollow structure.

Although more than one form of the invention has been shown and described in detail, it will be apparent to those skilled in the art that the invention is not so limited but that various changes can be made therein without departing from the spirit of the invention or from the scope of the appended claims.

I claim:

1. In the manufacture of glass cup sections adapted to be fused together in rim to rim relation in the formation of a hollow glass block; the method steps which comprise molding under pressure a body of molten glass into cup shape with inner recesses pressed partially through the bottom wall of the cup-shaped body as it is formed and at the same time forcing a series of wires to the bottoms of said recesses, and subsequently pressing the glass still in its molten state upon the portions of the bottom wall between the recesses to fill the latter and thereby completely embedding the wires in said bottom wall.

2. In the manufacture of glass cup sections adapted to be fused together in rim to rim relation in the formation of a hollow glass block; the method steps which comprise molding under pressure a body of molten glass into cup shape with inner recesses pressed partially through the bottom wall of the cup shaped body as it is formed and at the same time forcing a series of wires to the bottoms of said recesses, subsequently pressing the glass still in its molten state upon the portions of the bottom wall between the recesses to fill the latter and thereby completely embedding the wires in said bottom wall, and forming while executing the latter pressing step a series of ribs on the inner side of said bottom wall at substantially the locations where the recesses were filled.

3. In the manufacture of glass cup sections adapted to be fused together in rim to rim relation in the formation of a hollow glass block, the method steps which comprise molding under pressure a body of molten glass into cup shape with inner recesses pressed partially through the bottom wall of the cup shaped body as it is formed, while at the same time holding magnetically a plurality of wires in a predetermined relationship, forcing said wires during the pressing operation to the bottoms of said recesses while being so magnetically held and releasing the wires at the bottom of the recesses, and subsequently pressing the glass still in its molten state upon the portions of the bottom wall between the recesses to fill the latter and thereby embedding the wires in said bottom walls.

LAWRENCE O. GRIFFITH.